United States Patent [19]

Nambu

[11] Patent Number: 4,546,351
[45] Date of Patent: Oct. 8, 1985

[54] DATA TRANSMISSION SYSTEM WITH DISTRIBUTED MICROPROCESSORS

[75] Inventor: Shigeo Nambu, Fuchu, Japan

[73] Assignee: Tokyo Shibaura Denki Kabushiki Kaisha, Kawasaki, Japan

[21] Appl. No.: 434,184

[22] Filed: Oct. 14, 1982

[30] Foreign Application Priority Data

Oct. 18, 1981 [JP] Japan .................................. 56-166263

[51] Int. Cl.[4] .......................... H04Q 9/00; G06F 15/16
[52] U.S. Cl. ............................ 340/825.5; 340/825.52; 340/825.08
[58] Field of Search ........... 340/825.5, 825.52, 825.08; 370/85, 94

[56] References Cited

U.S. PATENT DOCUMENTS 4,281,380  7/1981  DeMesa, III et al. ................. 370/94
4,451,881  5/1984  Grice et al. ............................ 370/85

OTHER PUBLICATIONS

Standard Specification for S-100 Bus Interface Devices, IEEE Task 696.1/02, 1979, pp. 28-52, Elmquist et al.

German Office Action of Feb. 22, 1984 and Translation Reapplication, P3238532.3-31 (pp. 1-7).

Primary Examiner—Donald J. Yusko
Attorney, Agent, or Firm—Cushman, Darby & Cushman

[57] ABSTRACT

A data transmission system having a common request line and a special request line in addition to a transmission line. The special request line has priority over the common request line. A plurality of node stations are multi-drop connected to the transmission line. Among the node stations, a supervising station is connected to the special request line and takes precedence over other slave stations to become a master station. The master station collects data from the slave stations. The station connected to the common request line can assign a master control function to any station requesting to be assigned the master control function within a short period of time. Each station has an auto response control circuit. The master station automatically collects data by the auto response controlling circuit independently of the microprocessors of the slave stations.

20 Claims, 17 Drawing Figures

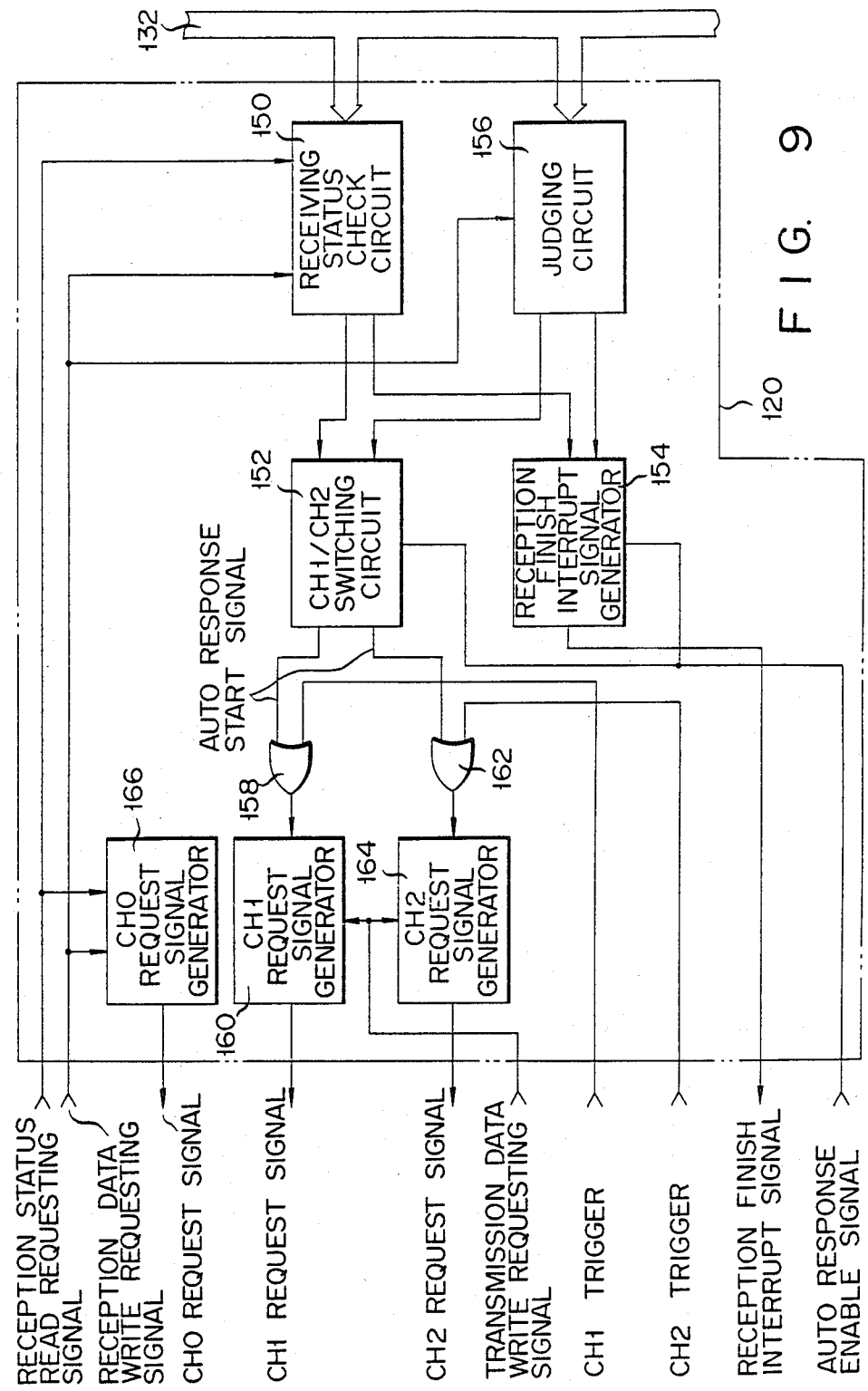

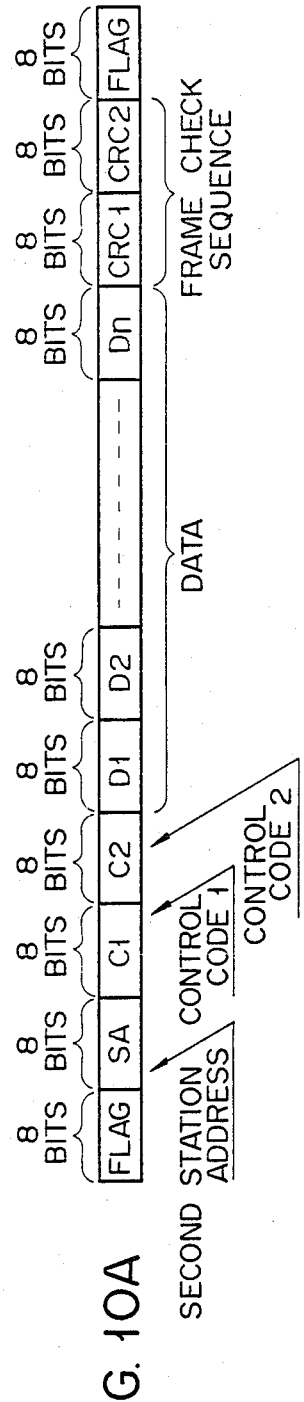
F I G. 10A
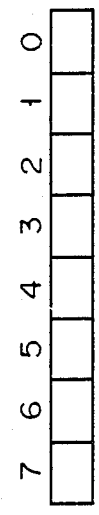
F I G. 10B
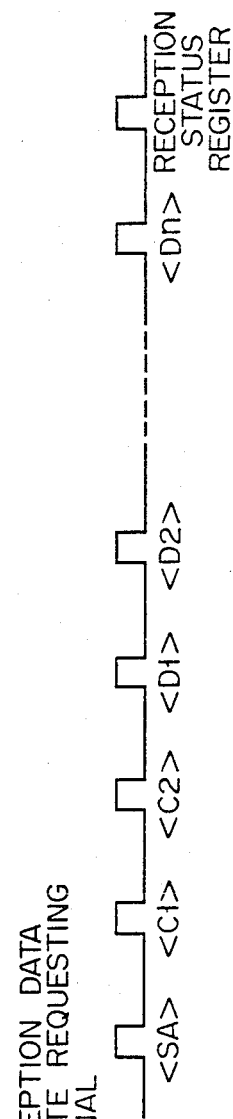
F I G. 11

DATA TRANSMISSION SYSTEM WITH DISTRIBUTED MICROPROCESSORS

BACKGROUND OF THE INVENTION

The present invention relates to a data transmission system and, more particularly, to a data transmission system which has a transmission line to which a plurality of node stations are connected in parallel and which increases the effective transmission speed.

In data transmission where a plurality of node stations are connected in parallel to the transmission line, (a multidrop connection), when node stations transmit data at random, a plurality of signals can simultaneously appear on the same transmission line. Thus, proper transmission often cannot be performed. The interference of signals from at least two signal sources on the same transmission line is called a contention. In order to prevent the contention and to smoothly exchange data between the node stations, a set of given rules is introduced for a data link to control the transmission. The set of given rules is called a protocol. Various types of protocols are used in data transmission or communication.

In these protocols, to maintain an orderly data link, the control function for the data link is given to one of the node stations. A station which performs the control function for a data link is called a master station. A station is defined as an independently controllable configuration of data terminal equipment from or to which messages are transmitted on a data link. The master station first indicates the start of transmission and then transmits data to a given slave station or receives data therefrom. The data link may have a configuration wherein the master station is predetermined and the remaining stations are defined as the slave stations. Alternatively, the data link may have another configuration wherein any station can be defined as the master station and the remaining stations are defined as the slave stations. The former configuration is called a 1:N communications system (master station:slave stations; 1:N). The latter configuration is called an N:N communications system. The present invention is concerned with the N:N communications system in which the master control function can be assigned to any station.

FIG. 1 shows a model of a conventional contention data transmission system.

Stations A and B respectively designated by reference numerals 12 and 14 are connected in a multi-drop manner to a transmission line 10. A busy status line 16 is used to indicate the occupying status of the transmission line 10. An output from an open collector transistor of and a TTL input gate of each station is connected to the busy status line 16. When a given station occupies the transmission line, the transistor is rendered ON. The ON/OFF state of the input gate determines whether or not the transmission line is occupied (busy). The station which initiates transmission sets the busy status line 16 to ON so as to indicate to other stations that the transmission line is busy. In this manner, when the busy status line is ON, other stations do not perform transmission. After completion of transmission, the master station sets the busy status line to OFF and returns to a slave station.

FIGS. 2A to 2D are timing charts showing the occupying status of the stations A and B and the status of the busy status line 16 in the data link in a time serial manner. In time intervals P1 and P2 of FIG. 2D, since one of the stations A and B is a master station while the other is not busy, no problem occurs. However, in time interval P3, since the transmission line 10 is not used, the stations A and B may simultaneously transmit data onto the transmission line 10. In this case, a contention occurs. In order to resolve this situation, all the stations stop transmitting data. Thereafter, retransmission is started, with a priority given among those stations so as not to cause a contention again. Time interval P4 indicates a time interval for resolving the contention in the transmission line. Referring to FIGS. 2A and 2B, the station A has a priority over the station B.

The contention system has an advantage in that a relatively simple protocol can be used for the data link, so that simple software can be used for a microprocessor. However, the following drawbacks are presented when high-speed and high-efficient data transmission between the stations is performed.

(1) When a small number of stations constitute a network and data is not frequently transmitted, the possibility of contention occurrence is low. However, when a large number of stations are used and the N:N transmission is performed, the possibility of contention occurrence becomes high. The data link can be thus locked for a long period of time.

(2) When many stations constitute the network, retransmission restoring procedures at the time of a contention occurrence become complex.

(3) Since a station which has the lowest priority has a small possibility of transmission line occupation, the overall efficiency of the data link is decreased.

The polling/selecting system will now be described. According to this system, the master control function is handed like a baton pass among the stations by polling and selecting without causing a contention. At this time, the transmission line is controlled by the master station. Therefore, a busy status line need not be used which indicates the status of the transmission line. The N:N communication data link using the polling/selecting system has the following advantages:

(1) Unlike the 1:N communications system, even if the master station is broken, the data link may not be disabled as a whole.

(2) It is possible to exchange data between two arbitrary stations of the data link.

(3) If the master control function of the current master station is assigned to another station which has the next number to that of the current master station, the transmission line occupation possibility of each station becomes substantially equal, thus eliminating the drawback of the contention system where the master control function is not equally assigned to each station.

(4) Since the master control function is assigned to a station in accordance with a given set of rules, the time interval required for restoring the transmission status after the contention occurrence is eliminated, resulting in high efficiency of use of the transmission line.

However, a problem occurs when the data link of the polling/selecting system is applied to a decentralized total control system. The decentralized type total control system such as a direct digital control measuring system comprises process control stations for exchanging required control data at high speed and a supervising station for connecting the control data (e.g., set value, control value, and processing value) from the process control stations. In this system, the overall efficiency of hierarchical network node stations and their effective transmission speed are significant.

When the data link of the polling/selecting system is used, the following problems are presented.

(1) In the case where the master station searches a station intended to be assigned the master control function, no problem occurs when the master station immediately finds such a station. Otherwise, the master station continues to search such a station until it is found. Thus, a long search time interval is required, prolonging the control period. The more significant control procedure is influenced. In order to eliminate the above drawback, a master search is interrupted for a given period of time if no station is found which can be assigned the master control function. In this case, special software such as a timer operation is required, thus leaving room for further improvement.

(2) In a case where the supervising station collects data, typical data of the control loop is periodically collected except for cases of remote control by the operator and of emergency analysis. When the time for data collection is reached, the master control function is assigned to the supervising station which then controls the slave stations to collect data. However, if the priority of assignment of the master control function to the supervising station is equivalent to that of the process control station for controlling the processings, it takes a long time interval for the supervising station to acquire the master control function. As a result, the change period of the control variable of the CRT display loop is prolonged.

(3) The time interval required for collecting data from the slave stations by the master station can be determined from FIG. 3. Vertical arrows indicate operating time intervals of the microprocessors in the master or slave stations and horizontal arrows indicate operating time intervals required for transmitting data between the two stations. These operating time intervals vary with the amount of data. It is noted that the length of the arrow is not in proportion to the actual time interval. Reference symbols t1 and t5 respectively denote transmission operating time intervals of the master and slave stations. In these time intervals, data are set to a transmitter LSI and a DMA control LSI. Reference symbols t2 and t6 respectively denote time intervals for transmitting data or a command on the transmission line, which vary with the transmission speed of the transmission line and the amount of data (number of bytes) to be transmitted. In serial transmission, the transmission time is calculated by the relation: $t=(n\times 8)/m$ (ms) where m is the transmission speed (kilobit/sec) and n is the amount of data (number of bytes). Therefore, the faster the transmission speed is, the faster data can be transmitted. Reference numerals t3 and t7 denote time intervals in which the microprocessor receives an interrupt signal indicating completion of reception of the command or data. Since the interruption may be masked for the software operation of the microprocessor and the higher priority order of interrupt signals must first be detected, the reception of the interrupt signal cannot be immediately confirmed by the microprocessor. Thus, the time intervals t3 and t7 cannot be neglected. Reference symbols t4 and t8 denote operating time intervals for which the microprocessor operates based on the interrupt signals indicating the completion of the data or command transmission. A given slave station checks whether or not a reception command error occurs and which command is received. Specified data is then written at a predetermined address of the memory. Thus, the given slave station prepares data to be transmitted to the master station in response to the command. The master station checks whether external noise is mixed in with the data response from the given slave station and whether requested data is returned. The master station then stores data in another memory area. The master station repeats the above operation for another given slave station.

Time interval T required for collecting data from a single slave station is equal to the sum of the time intervals t1 to t8:

$$T = \sum_{i=1}^{8} ti.$$

It takes at least the time interval NT for the master station to collect data from N slave stations. As a result, the processing speed of the system as a whole cannot be increased.

(4) The next significant problem is a matter of time matching of the data of each loop control station from which the supervising station collects data. As described in item (3), when data from the first slave station of N slave stations is compared with that from the Nth slave station thereof, data of the latter is lagged by time interval $(N-1)T$. In this manner, pieces of data from different slave stations are slightly lagged. No problem occurs when this time lag can be neglected. However, if the number of slave stations is increased, the amount of data is also increased. If the data transmission time interval is increased, simultaneity of the supervision is apparently affected.

The above problems of items (1) to (4) must be solved to accomplish a high-speed and precisely controllable diffusion type total control system.

SUMMARY OF THE INVENTION

It is, therefore, an object of the present invention to provide a data transmission system which has an increased effective transmission speed.

It is another object of the present invention to provide a data transmission system which more effectively searches a prospective master station.

It is still another object of the present invention to provide a data transmission system wherein simultaneity of data of each node station is improved.

These objects may be attained by a data transmission system, comprising: a transmission line; a request line for carrying a request signal indicating the ability to be assigned the master control function for controlling said transmission line; a plurality of node stations which are multi-drop connected to said transmission line and which hold a relationship of a master station and slave stations, each node station comprising auto response means connected to the transmission line, a control circuit which is connected to the request line to set the request line to a busy status when each node station requests to be assigned the master control function, a detecting circuit connected to the request line to detect the status of the request line, and a microprocessor which is connected to the auto response means, the control circuit and the detecting circuit so as to restrain search of the slave station which requests to be assigned the master control function when the request line is not set in the busy status, so as to assign the master control function to the slave station which requests to be assigned the master control function when only one of the slave stations requests to be assigned the master control function, and so as to execute a program of assigning the master control function in accordance with a polling-/selecting system when at least two of the slave stations request to be assigned the master control function, the microprocessor supplying various types of data and control signals to the auto response means, the control circuit and the detecting circuit, and the auto response means being operated on the basis of control data supplied through the transmission line and being independent of control of the microprocessor to receive data from the transmission line in a reception mode and to transmit data of a predetermined format onto the transmission line in a transmission mode.

According to the present invention, two systems are used to search a station which requests to be assigned the master control function (i.e. to become the master station). When only one slave station transmits a request signal onto the request line, the master control function is assigned thereto. However, when at least two slave stations request the master control function, the master control function is assigned to one of the slave stations in accordance with the polling/selecting system. When the request line is not set in the busy status, no search is performed since no slave station requested to be assigned the master control function. Thus, according to the present invention, a time interval for which the current master station searches the next prospective master station is eliminated. As a result, the stations can perform the control operation which is their original function.

Furthermore, according to the present invention, in the case where the master station collects data from the slave stations, thanks to the auto response means, the operation of the microprocessor of each slave station becomes unnecessary and the data transmission speed between the stations can be greatly increased. As a result, when the master station collects data from many slave stations, the time lag of collected data is eliminated, that is, the time matching among collected data is greatly improved.

BRIEF DESCRIPTION OF THE DRAWINGS

By way of example and to make the description clearer, reference is made to the accompanying drawings, in which:

FIG. 9 is a block diagram schematically showing the configuration of the auto response control circuit shown in FIG. 8;

FIGS. 10A and 10B are views showing the frame configurations of data to be processed by the auto response control circuit shown in FIG. 9;

FIG. 11 is a timing chart for the reception data read requesting signal of the automatic response control circuit shown in FIG. 9;

DETAILED DESCRIPTION OF THE PREFERRED EMBODIMENT

Figure 4:
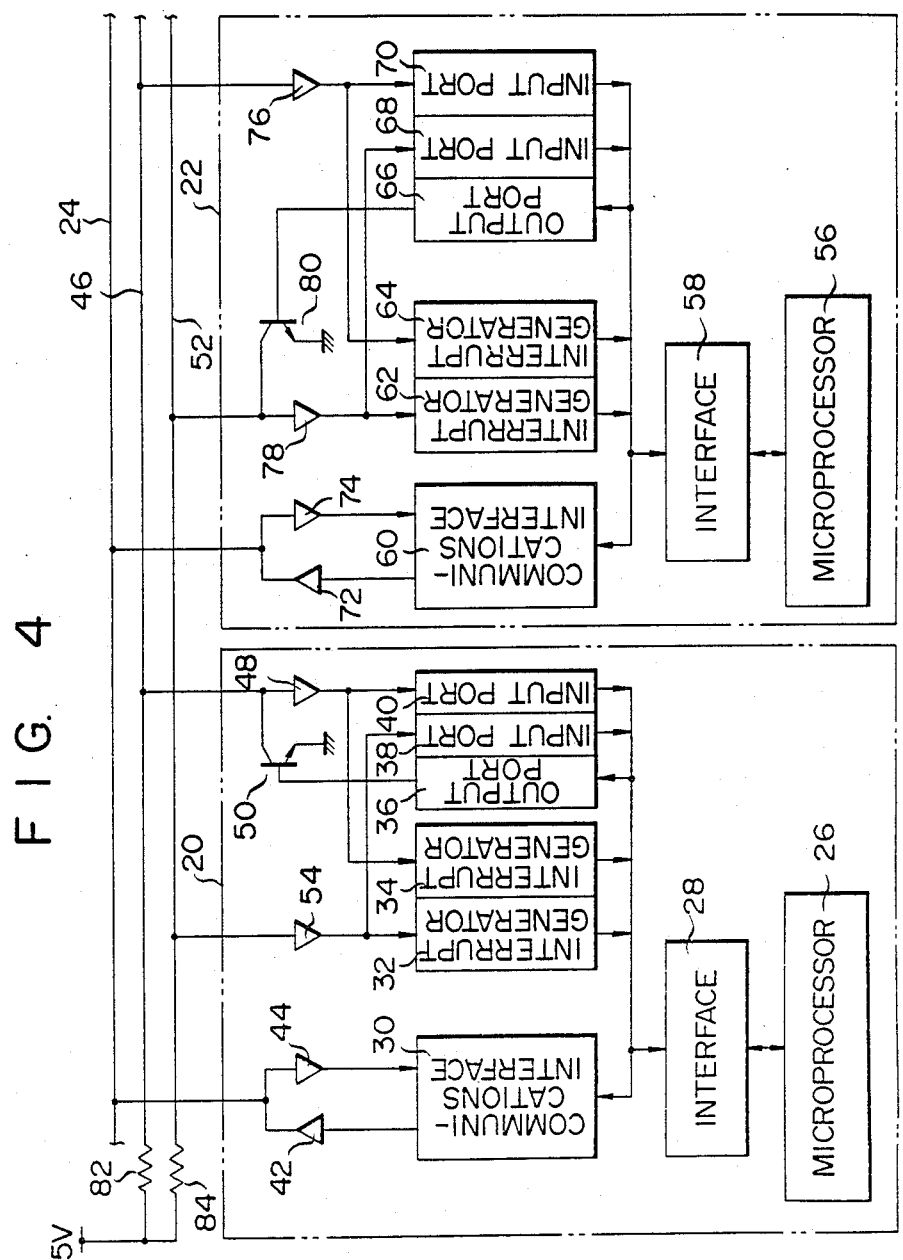
FIG. 4 is a schematic block diagram showing the overall configuration of a data transmission system according to an embodiment of the present invention.

FIG. 4 is a block diagram schematically showing the configuration of a data transmission system according to an embodiment of the present invention.

Referring to FIG. 4, a supervising station 20 and a process control station 22 are multi-drop connected to a transmission line 24. In practice, a plurality of process control stations 22 are connected to the transmission line 24.

The supervising station 20 comprises a microprocessor 26, an interface 28 connected to the microprocessor 26, a communications interface 30 for exchanging data with the microprocessor 26 through the interface 28, first and second interrupt generators 32 and 34, an output port 36, first and second input ports 38 and 40, a driver 42 and a receiver 44 which are arranged between the transmission line 24 and the communication interface 30, an input buffer 48 arranged between a special request line 46 and the second input port 40, a transistor 50 arranged between the special request line 46 and the output port 36, and an input buffer 54 arranged between a common request line 52 and the first interrupt generator 32.

The process control station 22 comprises a microprocessor 56, an interface 58 connected to the microprocessor 56, a communications interface 60 which exchanges data with the microprocessor 56 through the interface 58, third and fourth interrupt generators 62 and 64, an output port 66, third and fourth input ports 68 and 70, a driver 72 and a receiver 74 which are arranged between the transmission line 24 and the communications interface 60, an input buffer 76 arranged between the special request line 46 and the fourth input port 70, an input buffer 78 arranged between the common request line 52 and the third interrupt generator 62, and a transistor 80 arranged between the common request line 52 and the output port 66.

The transmission line 24 is connected to the outputs of the drivers 42 and 72 and the inputs of the receivers 44 and 74, respectively, of the supervising station 20 and the process control station 22. Transmission data is sequentially read out from memories of the interfaces 28 and 58, respectively, of the supervising station 20 and the process control station 22. Readout signals are converted to serial signals, respectively, by the communications interfaces 30 and 60 and are transmitted onto the transmission line 24, respectively, through the drivers 42 and 72. Reception signals on the transmission line 24, respectively, through the receivers 44 and 74 are converted from the serial signals to two pieces of 8-bit data by the communications interfaces 30 and 60. The two pieces of 8-bit data are respectively written in the memories of the interfaces 28 and 58.

The special request line 46 is used only by the supervising station 20 and is pulled up to +5 V by a pull-up resistor 82 so as to stabilize the signal level. The potential of the request line 46 is kept at 5 V when the open-collector connected transistor 50 of the supervising station 20 is OFF. However, the potential of the request line 46 is kept at 0 V when the transistor 50 is ON. The ON/OFF state of the transistor 50 is controlled by setting an output from the output port 36 to logic level "0" or "1" by the microprocessor 26.

The microprocessor 56 of the process control station 22 detects the status of the special request line 46 as a static logical level "0" or "1" through the input buffer 76 and the input port 70 and as an interrupt signal which is set from logic level "0" to "1" through the input buffer 76 and the fourth interrupt generator 64.

The common request line 52 has the same physical configuration and function as the special request line 46, except that the open-collector connected transistor 80 for the common request line 52 is arranged in the process control station 22 but not in the supervising station 20. The supervising station 20 detects the common request line status and its change by the first input port 38 and the first interrupt generator 32. However, the supervising station 20 cannot change the status of the common request line. The process control station 22 can change the status of the common request line 52. At the same time, the process control station 22 can detect the status of the common request line 52 and its change. The common request line 52 is pulled up to +5 V by a pull-up resistor 84 so as to stabilize the signal level.

The status changes are detected as interrupt signals which are respectively supplied to the microprocessors 26 and 56 through the request lines 46 and 52. Thus, the microprocessors need not always supervise the statuses of the request lines 46 and 52.

Figure 5:
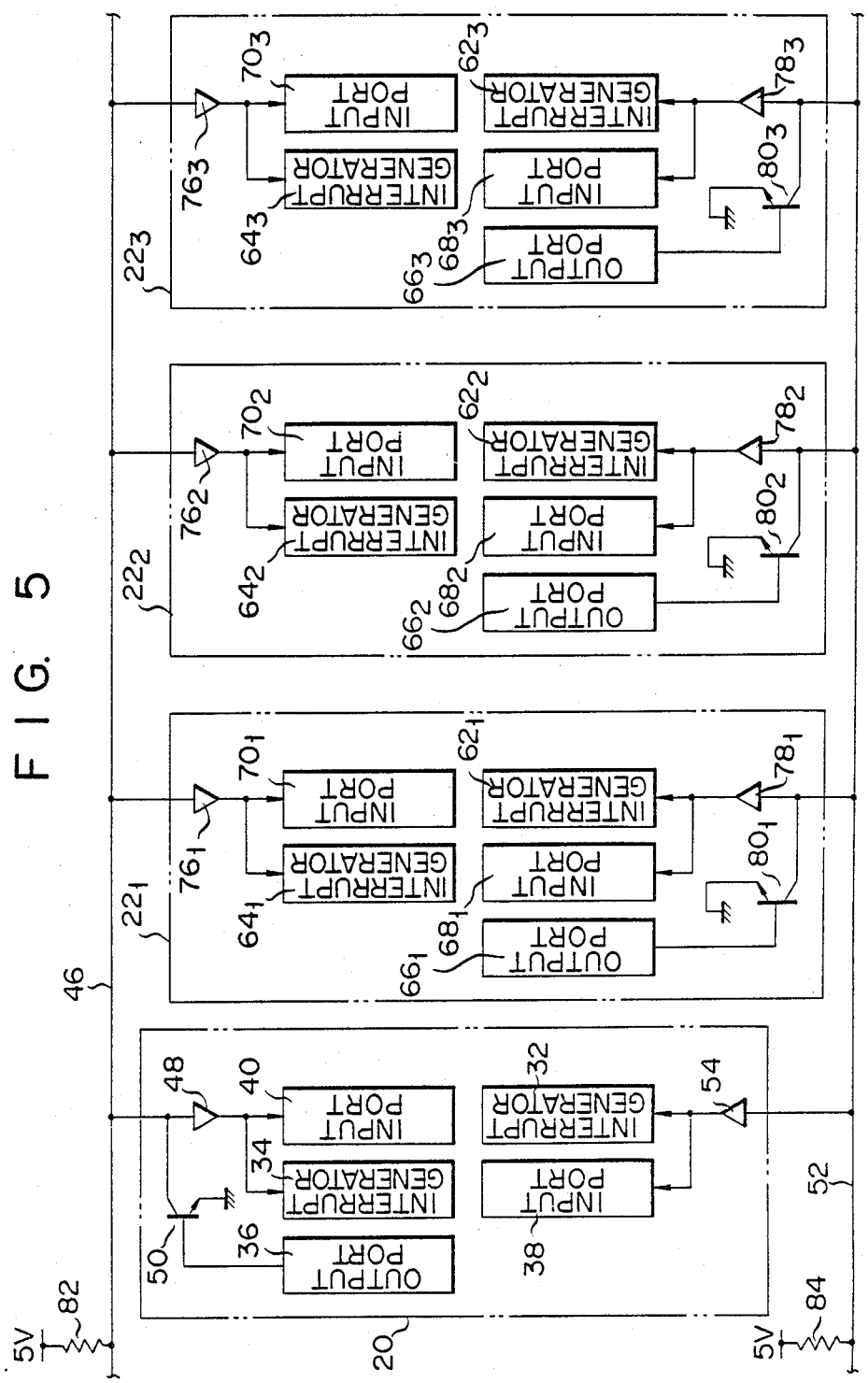
FIG. 5 is a schematic block diagram showing the configuration of components and their connections which are related to special and common request lines among the components of the data transmission system of the present invention.

FIG. 5 shows the components of the configuration which are related to the special and common request lines 46 and 52 of stations 20 and 22 ($22_1$, $22_2$ and $22_3$) and their connections. The same reference numerals used in FIG. 4 denote the same parts in FIG. 5.

The special request line 46 is controlled by the supervising station 20. Since open-collector outputs from transistors $80_1$ to $80_3$ of the process control stations $22_1$ to $22_3$ are wired-OR connected to the common request line 52, any one of the process control stations $22_1$ to $22_3$ can control. Specifically, when at least one of the transistors $80_1$ to $80_3$ is ON, the common request line 52 is kept at 0 V.

Figure 6:
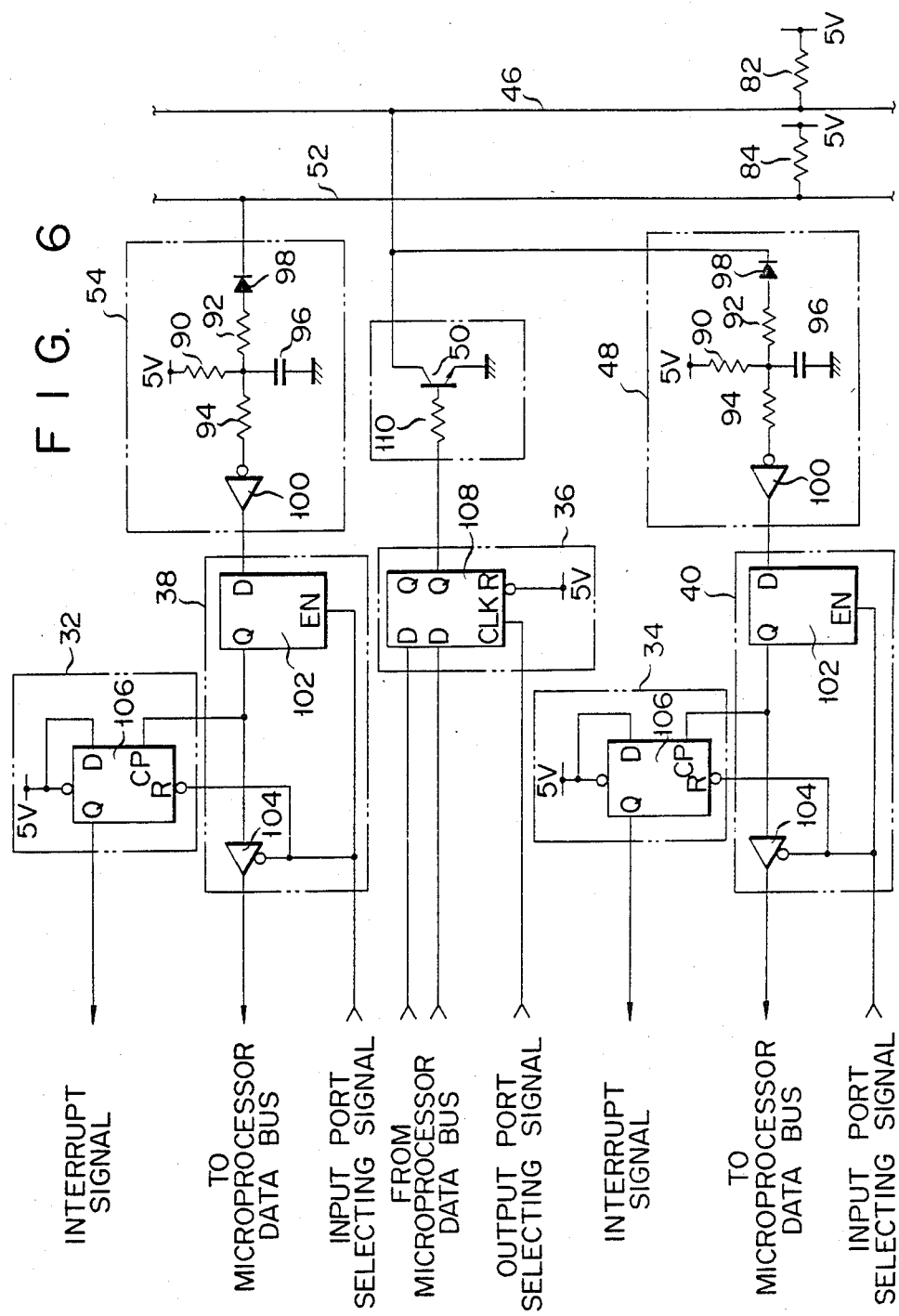
FIG. 6 is a circuit diagram of part of the system which is related to special and common request lines of the supervising station shown in FIG. 4.

FIG. 6 shows a circuit diagram of the configuration (of the supervising station 20 shown in FIG. 4) which are related to the special request line 46 and the common request line 52.

Referring to FIG. 6, the input buffer 54 comprises resistors 90, 92 and 94, a capacitor 96, a diode 98, and an inverter 100 which produces a Schmitt trigger output. The resistors 90, 92 and 94, and the capacitor 96 constitute a noise filter. The diode 98 prevents a current flow into the station via the common request line 52 when a power failure of a +5 V power source in the station occurs. The inverter 100 which produces the Schmitt trigger output shapes a signal waveform which is slowly changed by the noise filter so as to sufficiently decrease the rise time. The output from the inverter 100 is supplied to a D flip-flop 102 of the input port 38.

The input port 38 comprises the D flip-flop 102 and a 3-state buffer 104 connected to the output terminal Q of the D flip-flop 102. An input port selecting signal is supplied to an enable terminal EN of the D flip-flop 102. When the terminal EN is high (logical one), the input D is passed to the output Q of the D flip-flop 102. The output terminal Q of the D flip-flop 102 is connected to the clock input terminal of a D flip-flop 106. An output from the 3-state buffer 104 is connected to the data bus of the microprocessor.

The D flip-flop 106 of the interrupt generator 32 generates an interrupt signal when a clock pulse is supplied to the clock input terminal CP thereof.

The output port 36 comprises a D flip-flop 108. The output terminal Q of the flip-flop 108 is connected to the special request line 46 through a resistor 110 and the transistor 50. The microprocessor data bus is connected to the input terminal D of the D flip-flop 108. The input to the input terminal D is transmitted to the output Q in response to the output port selecting signal supplied to the clock input terminal CLK thereof.

The input buffer 48, the input port 40, and the interrupt generator 34 are further connected to the special request line 46. These circuits have the same configurations of the input buffer 54, the input port 38 and the interrupt generator 32, respectively. Reference numerals 54, 38 and 32 denote the same components, and a detailed description thereof will be omitted.

FIGS. 7A to 7G are timing charts for explaining operations of the I/0 ports and the interrupt generator which are shown in FIG. 6 with respect to the special request line.

Figure 7:
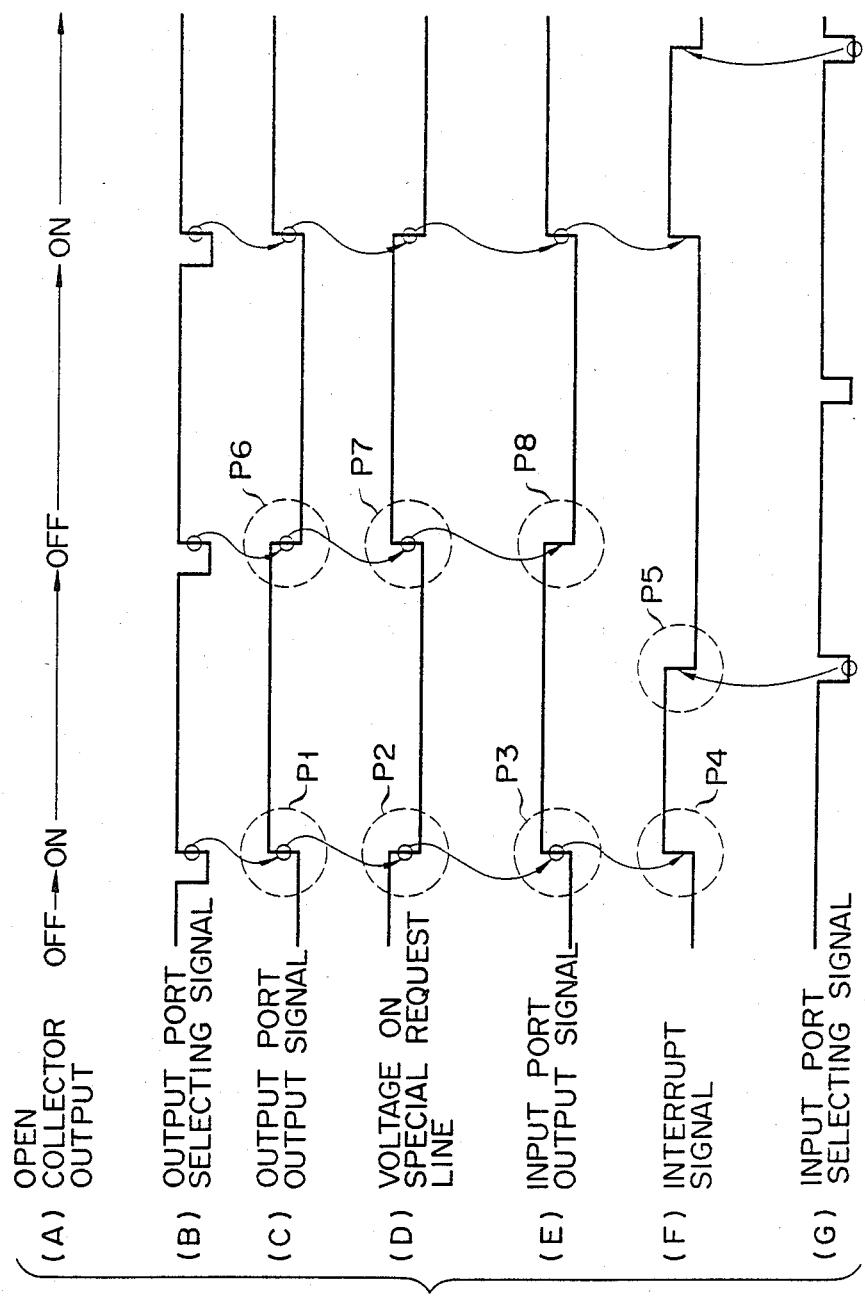
FIGS. 7A to 7G are timing charts for explaining the mode of operation of the circuit shown in FIG. 6.

An output port selecting signal is supplied to the terminal CLK of the D flip-flop 108 of the output port 36 so as to turn ON the special request line 46 (FIG. 7B). The output status of the flip-flop 108 is changed at the leading edge of the output port selecting signal (time interval P1 in FIG. 7C). When the output from the output port 36 becomes logic level "1", the transistor 50 is ON, and the potential of the special request line 46 is dropped to 0 V (time interval P2 in FIG. 7D).

At the same time, the output from the input buffer 48 which is connected to the special request line 46 is inverted to logic level "1". The signal of level "1" from the input buffer 48 is supplied to the input terminal D of the D flip-flop 102 in the input port 40. Since the terminal EN of the D flip-flop 102 is kept high, the output from the D flip-flop 102 goes to logic level "1" (time interval P3 in FIG. 7E).

Simultaneously, the signal of level "1" is supplied to the terminal CP of the D flip-flop 106 in the interrupt generator 34. The interrupt signal is produced from the D flip-flop 106 (time interval P4 in FIG. 7F). In this manner, the supervising station 20 sets the special request line 46 to the ON status (0 V), and the interrupt signal is produced at the ON timing thereof.

When the input port selecting signal is set to logic level "0", the input port 40 supplies a signal of level "1" to the data bus of the microprocessor through the 3-state buffer 104. At this time, the input port selecting signal clears the flip-flop 106 in the interrupt generator 34 (time interval P5 in FIG. 7F).

However, when the input port selecting signal is set to logical level "0", the output from the D flip-flop 102 in the input port 40 is latched. Therefore, even if the potential of the special request line 46 is changed during data readout, the state of the signal from the input port 40 to the data bus may not be changed.

The supervising station 20 sets the output from the output port 36 to logic level "0" (time interval P6 in FIG. 7C) so as to turn off the special request line 46. The transistor 50 is then turned off, and the potential of the special request line 46 is increased to +5 V (time interval P7 in FIG. 7D). The signal of +5 V is converted to a signal of logic level "0" by the input buffer 48. This signal of logic level "0" is supplied to the interrupt generator 34 through the D flip-flop 102. However, a change in signal state (time interval P8 in FIG. 7E) from logic level "1" to "0" does not allow generation of the interrupt signal. In this condition, when the input port selecting signal is set to logic level "0", a signal of logic level "0" is produced by the input port 40.

The input and output ports 40 and 36 and the interrupt generator 34, which are related to the special request line 46 of the supervising station 20, have been described. The input port 38 and the interrupt generator 32 which are connected to the common request line 52 have the same configuration and function as the input port 40 and the interrupt generator 34, and a detailed description thereof will be omitted.

Similarly, since the input and output ports and the interrupt generator which constitute the process control station 22 have the same configuration and function as the input and output ports 40 and 36 and the interrupt generator 34, a detailed description thereof will also be emitted.

Figure 8:
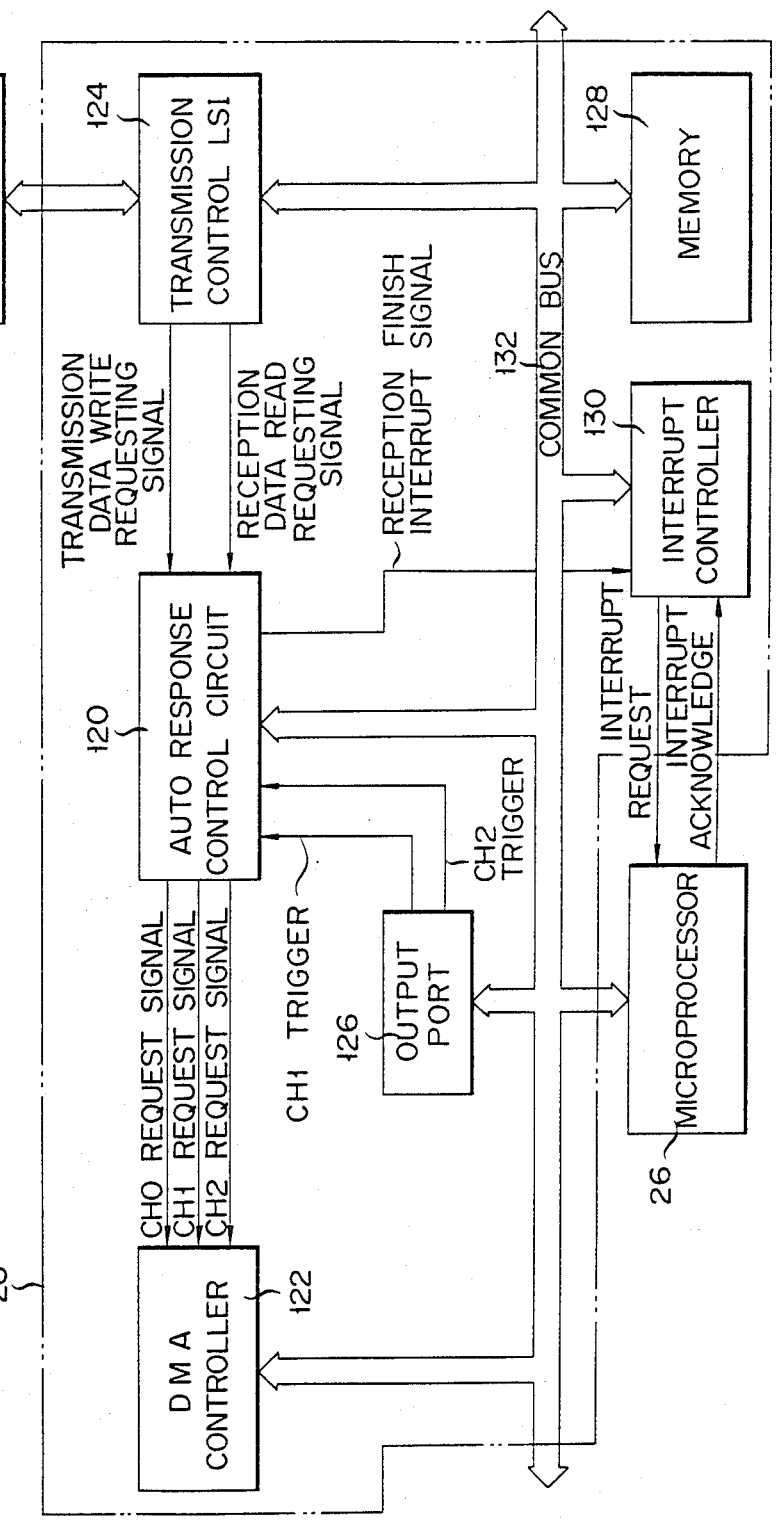
FIG. 8 is a block diagram schematically showing the configuration of the interface shown in FIG. 4.

FIG. 8 is a block diagram schematically showing the configuration of the interface 28 arranged between the communications interface 30 and the microprocessor 26 as shown in FIG. 4. The interface 28 is the same as the conventional interface except that an auto response control circuit 120 is added.

The interface 28 comprises a DMA controller 122, the auto response control circuit 120, a transmission control circuit LSI 124, an output port 126 for generating a trigger signal to the auto response control circuit 120, a memory 128 including a ROM and a RAM, an interrupt controller 130, and a common data bus 132 connected to the above components of the interface 28. In the DMA controller 122, a channel No. 0 (CH0) is assigned to data reception and channels Nos. 1 and 2 (CH1 and CH2) are assigned to data transmission.

FIG. 9 is a block diagram schematically showing the configuration of the auto response control circuit 120 shown in FIG. 8.

A receiving status check circuit 150 connected to the common data bus 132 receives data in the form of a train of 8-bit characters from the common data bus 132 in accordance with the reception data read requesting signal from the transmission control LSI 124, and checks whether or not reception is completed without an error on the basis of predetermined reception data in a data frame. If no error is detected, the receiving status check circuit 150 supplies a signal to either the CH1/CH2 switching circuit 152 or the reception finish interrupt signal generator 154 which are connected thereto, in accordance with the contents of the data.

The reception data read requesting signal is also supplied to a judging circuit 156 connected to the common data bus 132. The judging circuit 156 latches the third character of the reception data frame in accordance with the reception status read requesting signal. The data frame will be described in detail hereinafter. In accordance with the content of the reception data described above, the judging circuit 156 supplies a signal to either the CH1/CH2 switching circuit 152 or the reception finish interrupt signal generator 154. Specifically, when the contents of the data indicates the auto response mode, the judging circuit 156 supplies, to the CH1/CH2 switching circuit 152, a selection signal which specifies which channel (CH1 or CH2) of the DMA controller 122 is to be used. However, when contents of data do not indicate the auto response mode, the judging circuit 156 supplies an enabling signal to the reception finish interrupt signal generator 154.

An auto response start signal for the channel CH1 of the CH1/CH2 switching circuit 152 is supplied to a CH1 request signal generator 160 through an OR gate 158. An auto response start signal for the channel CH2 is supplied to a CH2 request signal generator 164 through an OR gate 162. The reception data read requesting signal and the reception status read requesting signal each are supplied to a CH0 request signal generator 166.

FIGS. 10A and 10B show respectively formats of the data frames to be processed in the auto response control circuit 120. FIG. 11 is a timing chart of the reception data read requesting signal.

Referring to FIG. 10A, the first three bytes indicated by <FLAG>, <SA>, and <C1> and the last three bytes indicated by <CRC1>, <CRC2>, and <FLAG> are standard portions of the HDLC protocol. In this embodiment, the control code is expanded to include a second control code <C2>. Reference symbols D1 to Dn respectively indicate 8-bit data. However, the data length may vary. The bit configuration of <C> is shown in FIG. 10B: the third and seventh bit positions have meanings to be described later.

The mode of operation of the auto response control circuit 120 will be described. When the auto response enabling signal of logic "1" is produced by the microprocessor 26 to set the auto response control circuit 120 to the ready state, the transmission control LSI 124 supplies, to the CH0 request signal generator 166, the reception data read requesting signal for each byte from the second byte <SA> of the data frame. The reception data read requesting signal is also supplied to the receiving status check circuit 150 and the judging circuit 156. The CH0 request signal generator 166 then generates the CH0 request signal to the DMA controller 122. In response to the CH0 request signal, the DMA controller 122 reads out reception data in units of bytes.

The judging circuit 156 latches reception data of the third byte (<C2> in FIG. 10A) among pieces of data sequentially read out through the channel CH0 of the DMA controller 122 and supplied onto the common data bus 132. When the value of the seventh bit of <C2> is set to logic level "1", the judging circuit 156 determines that the reception data indicates the auto response mode. Furthermore, the judging circuit 156 determines which one of the channels CH1 and CH2 of the DMA controller 122 is to be used in accordance with the value of the third bit of <C2>. The judging circuit 156 then supplies a signal representing the selected channel to the CH1/CH2 switching circuit 152. Specifically, when data from the third bit is set to logic level "0", the judging circuit 152 determines that the reception data indicates the CH1 auto response mode. However, when data from the third bit is set to logic level "1", the judging circuit 152 determines that the reception data indicates the CH2 auto response mode. When the seventh bit of <C2> is set to logic level "0", the judging circuit 156 determines that the reception data does not indicate the auto response mode. Therefore, the judging circuit 156 supplies a signal to the reception finish interrupt signal generator 154.

When the DMA controller 122 receives the final byte Dn of the data frame as shown in FIG. 10A, the transmission control LSI 124 supplies the receiving status read signal to the CH0 request signal generator 166. Thus, the CH0 request signal generator produces a CH0 request signal. In response to the CH0 request signal, the DMA controller 122 causes the receiving status check circuit 150 to latch data read out onto the common data bus 132. The receiving status check circuit 150 determines whether or not data is received in the corresponding data frame.

When the microprocessor 26 performs transmission using the output port 126, for example, when special data is exchanged between the two stations in which a slave station is assigned to a master station for transmission, the output port 126 produces CH1 and CH2 trigger signals. These trigger signals are respectively supplied to the CH1 and CH2 request signal generators 160 and 164 through the OR gates 158 and 162, respectively. In other words, the DMA controller 122 may be controlled by the trigger signals from the output port 126 controlled by the microprocessor 26 as well as in the auto response mode.

When the auto response enabling signal from the microprocessor 26 is set to logic level "0", the auto response control circuit 120 does not operate. In this case, the interface 28 produces the reception finish interrupt signal every time reception is performed, in the same manner as the conventional interface which does not have the auto response control circuit 120.

The mode of operation will be described in which the master control function is assigned to a slave station.

Figure 12:
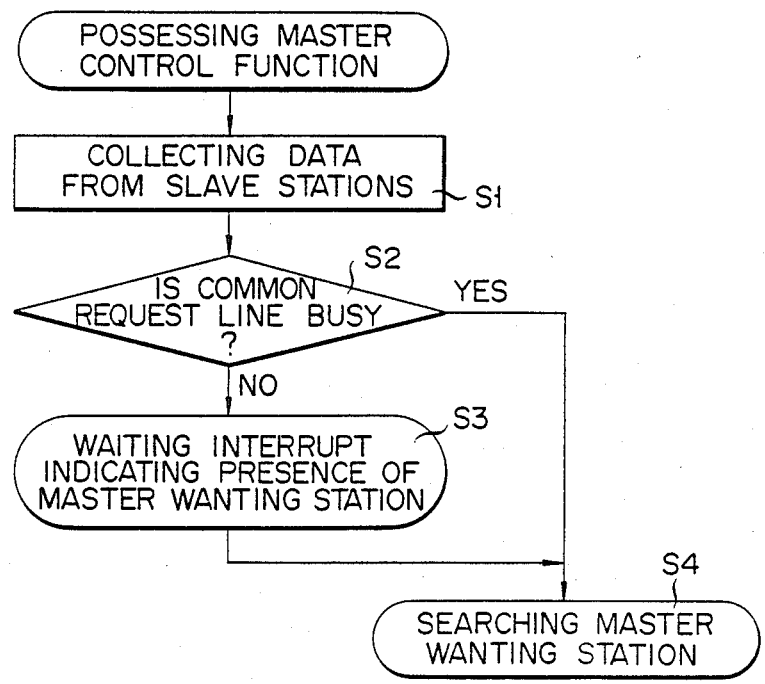
FIG. 12 is a flow chart for explaining the flow of assignment of the master control function according to an embodiment of the present invention.
Figure 13:
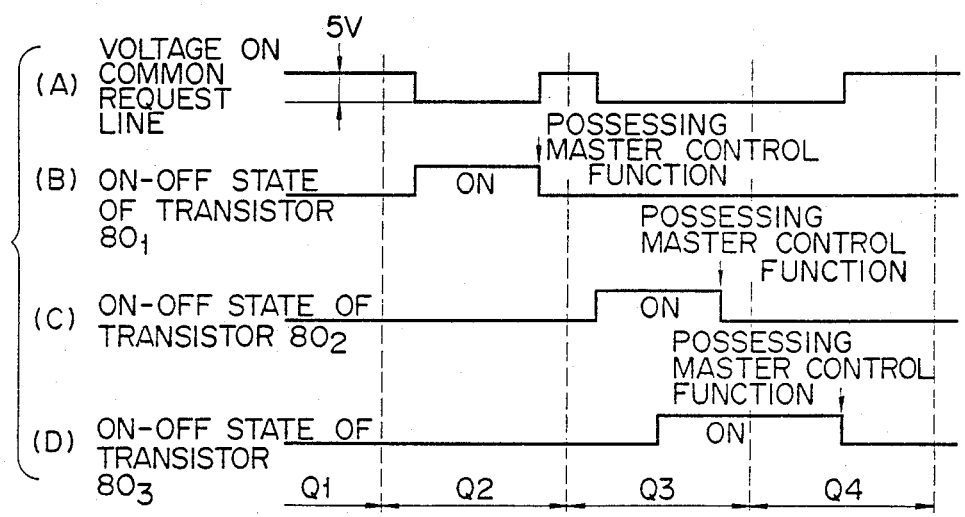
FIGS. 13A to 13D are views for explaining the flow of operation of the process control station and the common request line when the master control function is assigned to a prospective master station.

The master station performs assignment of the master control function in accordance with the flow chart shown in FIG. 12. Assume that a given station has the master control function, that the transistors $80_1$ to $80_3$ of the process control stations $22_1$ to $22_3$ are OFF, and that the common request line 52 is kept at +5 V (time interval Q1 in FIGS. 13A to 13B). In this condition, since the common request line 52 is kept at +5 V, the master station does not search for a master wanting station or a master control function requesting station (step S3 in FIG. 12). FIG. 13B shows a state where the transistor $80_1$ is ON since the process control station $22_1$ requests to be assigned the master control function. When the transistor $80_1$ is ON, the voltage of the common request line 52 drops to 0 V, as shown in FIG. 13A. The interrupt signals are respectively generated by the interrupt generators 32, and $62_1$ through $62_3$. The microprocessors of the stations perform the interrupt signal processing. However, only the current master station starts searching for a station which requests to be assigned the master control function (step S4 in FIG. 12). No other slave station searches for a master control function requesting station. The process control station $22_1$ which has been assigned the master control function causes the transistor $80_1$ to turn off (FIG. 13B).

As shown in the time interval Q3 in FIGS. 13A to 13D, the process control station $20_2$, for example, turns on the transistor $80_2$ as a master control function requesting station. Before the process control station $20_2$ is assigned the master control function, the process control station $22_3$ may request to be assigned the master control function by turning on the transistor $80_3$. In this condition, after the current master station collects data from other stations (step S1 in FIG. 12), the status of the common request line 52 is checked using the input ports 38, and $68_1$ through $68_3$. In this manner, the current master station checks whether or not the common request line 52 is still busy (step S2 in FIG. 12). If it is determined that the common request line 52 is busy, the polling/selecting system is used to search for the master wanting station (step S4 in FIG. 12). In this embodiment, the process control station $22_2$ is assigned the master control function in the time interval Q3 in FIGS. 13A to 13D. The process control station $22_3$ is assigned the master control function in the time interval Q4.

In this manner, wasteful time required in the conventional data link for searching for a master control function requesting station is eliminated. Thus, the processing capacity of the microprocessor can be used for control of the process control station.

The mode of operation will be described in which the process control stations $22_1$ through $22_3$ assign the master control function to the supervising station 20. When the supervising station 20 requests to be assigned the master control function, it causes the transistor 50 to turn on, so that the voltage of the special request line 46 is changed from +5 V to 0 V. The process control stations $22_1$ through $22_3$ are interrupted. The current master process control station collects necessary data therefor, and the current master process control station does not search a master control function requesting station. Instead, the current master station checks whether or not any station requests the master control function. In response to the above checking, the supervising station 20 obtains the master control function.

The interrupt operation by the special request line 46 has priority over that by the common request line 52. In this embodiment, the process control stations $22_1$ through $22_3$ use the common request line 52 to assign the master control function. Therefore, the process control stations $22_1$ to $22_3$ are operated independently of the supervising station 20. Therefore, the present invention may be applied to a system which has only the process control stations $22_1$ through $22_3$ and does not require the supervising station 20. Furthermore, when the supervising station is present, the master control function is readily assigned thereto in a short period of time.

The operation for decreasing data collecting time required between the stations will now be described.

Figure 1:
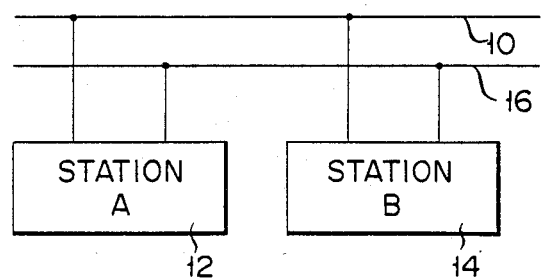
FIG. 1 is a schematic view showing the overall configuration of a conventional data transmission system with a contention system.
Figure 2:
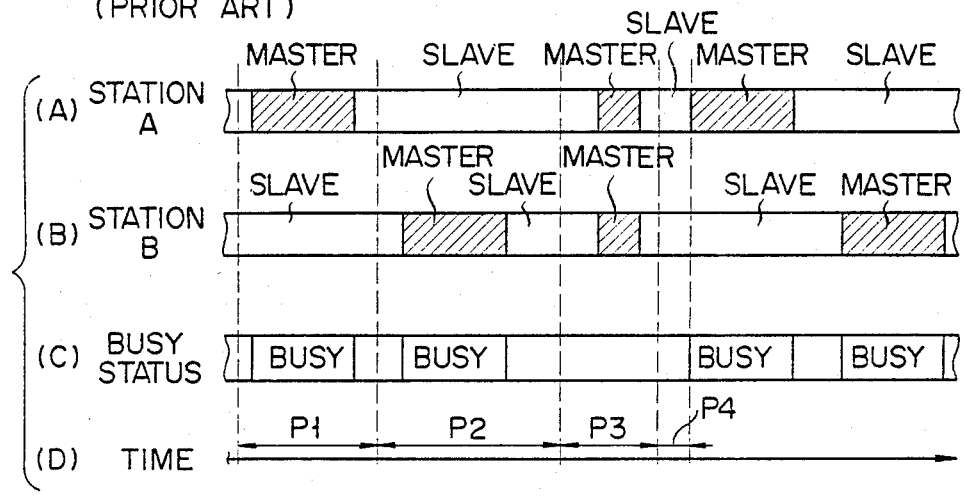
FIGS. 2A to 2D are timing charts for explaining the mode of operation of the data transmission system shown in FIG. 1.
Figure 3:
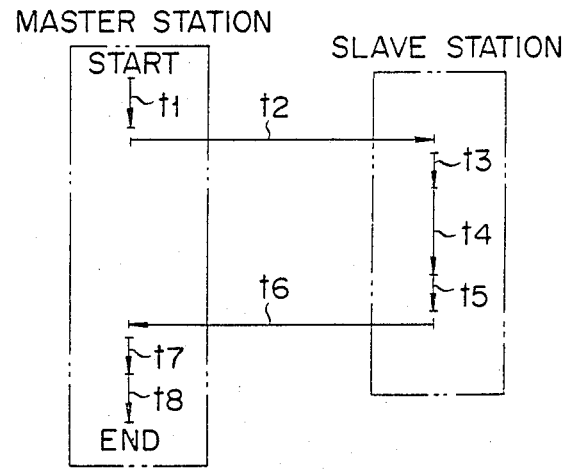
FIG. 3 is a model showing the time intervals required for collecting data from slave stations by the master station in the conventional data transmission system shown in FIG. 1.

Among the processing time intervals shown in FIG. 3, the time intervals t2 and t6 are signal propagation time intervals between the two stations and cannot be decreased without increasing the signal transmission speed. The transmission speed cannot be greatly increased without affecting hardware and manufacturing costs. Therefore, assuming the time intervals t2 and t6 are the same as those in the conventional device, and that a method for decreasing the time interval T will be considered.

In the data link using the polling/selecting system, communication between the master station and the slave station is performed by a pair of operations wherein the master sends a command to the slave station and the slave station responds to the command. Four types of commands and responses according to the data link of the present invention are shown in Table 1.

TABLE 1

| Command of Master Station | Response of Slave Station |
| --- | --- |
| 1. Master wanting station? (Master wanting station search command) | YES or NO |
| 2. Be a master station. (Master control function assignment command) | No response |
| 3. Send general data. | Data (every time the same) |
| 4. Send special data. | Data (different data according to a different master station) |

Responses 1 and 3 in Table 1 can be immediately supplied to the master station in response to master commands 1 and 3, respectively. However, response 4 must be made after necessary data, for checking the content of the received command, is prepared in the transmission buffer. Response 2 need not be transmitted to the master station.

If responses 1 and 3 which are most frequently used are performed by hardware without operating the slave station processor, the time intervals t3, t4 and t5 of the time interval T become substantially zero.

According to the present invention, the above effect can be obtained by the following mode of operation.

The master station sets the auto response enabling signal shown in FIG. 9 to logic level "0", whereas the slave station sets it to logic level "1". When the master station receives the response from the slave station, the interrupt signal is always generated. The slave station performs the reception interrupt processing in accordance with the value of the seventh bit of <C2> of the command from the master station. Otherwise, the slave station automatically responds to the master station without generating the interrupt signal.

The master station uses the CH1 transmission buffer of the DMA controller 122 shown in FIG. 4A and transmits the four commands shown in Table 1 to the slave station.

In command 1 "Master wanting station?" in Table 1, data of a secondary station address of the corresponding slave station is written in the byte <SA>, and a code given by the HDLC protocol is written in the byte <C1>. Furthermore, data of logic level "1" is written in the seventh bit of the byte <C2> and data of logic level "0" is written in the third bit of the byte <C2> (master station's command in which the slave station must transmit the contents of the CH1 transmission buffer by auto response). At the same time, the master station also transmits a code indicating "Master wanting station?" to the slave station. When such a command is received by the slave station, the auto response control circuit 120 of the slave station automatically transmits the content of the memory address of the CH0 to the master address. At this time, the microprocessor 26 of the slave station may be independent of all of the above operations. The slave station transmits, as the response, address data, a code defined by the HDLC protocol, and a code indicating "YES" or "NO". The address data is written in the byte <SA> of the master station, the code defined by the HDLC protocol is written in the byte <C1> thereof, and the code indicating "YES" or "NO" is written in the byte <C2> thereof. If the slave station does not request the master control function, the microprocessor 26 of the slave station prestores the "NO" code (e.g., 01H; hexadecimal number) as the content corresponding to the byte <C2> of the CH1 transmission buffer. Unless the microprocessor 26 changes this value, the slave station always transmits the "NO" code in response to the command "Master's wanting station?". When the slave station requests to be assigned the master control function due to control procedure, the microprocessor 26 changes the content of the byte <C2> to a "YES" code (e.g., 02H). Thereafter, when the command "Master wanting station?" is received by the slave station, the slave station transmits the "YES" code. When the master station receives the "YES" code, the master station transmits a command "Be a master station" to the slave station. When the slave station receives this command, it is assigned the master control function.

Figure 14A:
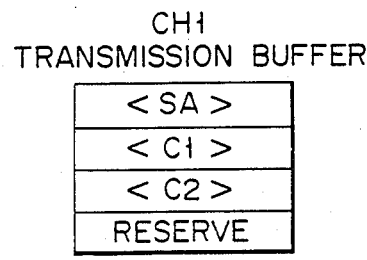
FIGS. 14A and 14B are views showing the configurations of the reception and transmission buffers at the time of auto response operation by the DMA controller shown in FIG. 8.
Figure 14B:
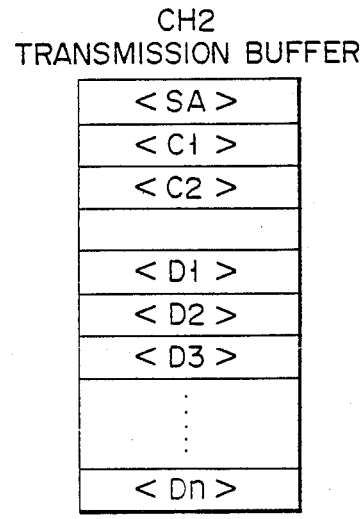

In command 3 "Send general data" in Table 1 (the command which requests a response of transmitting the contents of the CH2 transmission buffer of the DMA controller 122 having the configuration as shown in FIG. 14B), the master station sets the seventh and third bits of the command byte <C2> respectively to logic level "1". Further, the master station transmits a code "Send general data" to the slave station. Command 3 is used when the supervising station 20 is the master station. The process control stations 22$_1$ through 22$_3$ as the slave stations continuously store necessary data in the CH2 transmission buffer.

In command 4, different data is required in accordance with the type of the master station, that is, the supervising station or the process control station, or even among the process control stations. The slave station collects necessary data after command 4 is received and must store it in the transmission buffer. The seventh bit of the byte <C2> of command 4 is set to logic level "0". Thus, when the slave station receives command 4, interruption occurs.

As described above, according to the present invention, the time required under command 3 for collecting data from one slave station by the supervising station is time interval T'=t1+t2+t6+t7+t8. As compared with the conventional data link, the time intervals t3+t4+t5 can be eliminated for each slave station. The total time required for collecting data from n slave stations is nT'.

Further, in response to command 1 "Master wanting station?", the response time is also decreased. Thus, according to this embodiment, the effective data transmission speed can be increased.

Time matching of the data from each station will now be described. The conventional problem lies in the fact that a non-negligible time lag occurs in collecting pieces of data since the supervising station 20 collects data from each station which transmits current data. However, according to the present invention, the supervising station 20 simultaneously supplies a data updating command to the process control stations 22$_1$ through 22$_3$. Thereafter, pieces of data are collected from the process control stations 22$_1$ through 22$_3$.

Figure 15:
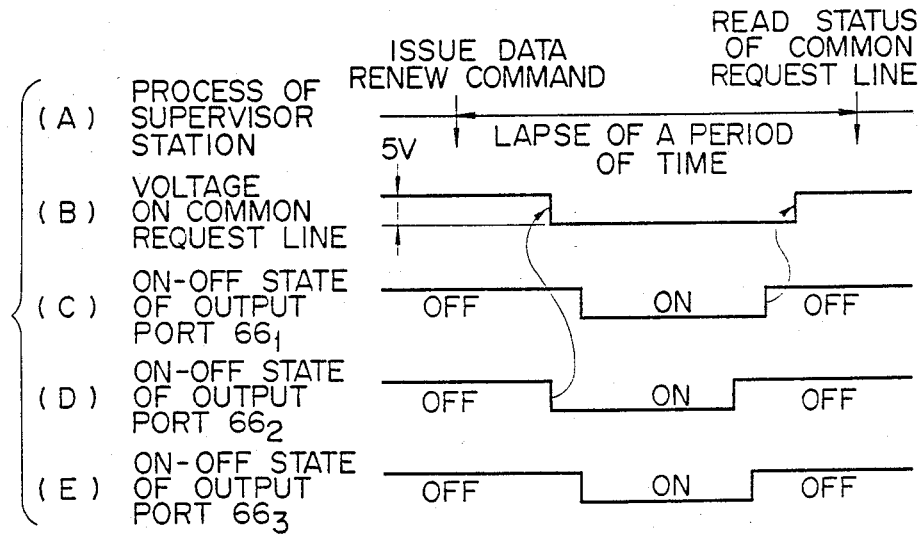
FIGS. 15A to 15E are timing charts for explaining the improved timing control according to the present invention.

A group polling incorporating the global address defined by the HDLC protocol is used as the data updating command. In this command, the byte <SA> comprises 8-bit data of "11111111". When the data updating command is received by the slave stations, these stations generate reception interrupt signals. When the interrupt operation occurs due to the data updating command, the process control stations $22_1$ through $22_3$ as the slave stations, respectively, turn on the transistors $80_1$ through $80_3$ and set the common request line 52 to 0 V. The CH2 transmission buffer shown in FIG. 14B is updated with the latest data. When updating is completed, the process control stations $22_1$ through $22_3$ respectively turn off the transistors $80_1$ through $80_3$, and set the common request line 52 to +5 V. When the process control stations $22_1$ through $22_3$ receive the data updating command, they perform an identical operation, so that the state of the common request line 52 is set as shown in FIG. 15B. As shown in FIGS. 15C to 15E, after the data updating command is transmitted, the timings at which the output ports $66_1$ through $66_3$ of the process control stations $22_1$ through $22_3$ are turned on vary in accordance with the various timings at which the processors of the process control stations $22_1$ through $22_3$ perform the interrupt operation in accordance with the state of the interrupt mask control of the program. Therefore, the OFF timings vary between stations. However, since the open-collector transistor outputs of the stations are wired-OR connected, the potential of the common request line 52 is kept at 0 V (ON state) from the time at which the first one of the output ports $66_1$ through $66_3$ goes high to the time at which the last one thereof goes low, as shown in FIG. 15B.

As shown in FIG. 15A, when the supervising station 20 checks that the potential of the common request line 52 is changed from 0 V to +5 V after a given period of time has elapsed since the data updating command is transmitted, the data updating of all the process control stations $22_1$ through $22_3$ can be confirmed.

In this manner, in the group polling incorporating the global address, data is collected after all the process control stations $22_1$ through $22_3$ update their data, so that simultaneity of data collected from the process control stations $22_1$ through $22_3$ can be maintained.

The present invention is not limited to the particular embodiment described above. Various changes and modifications may be made within the spirit and scope of the present invention.

What is claimed is:

1. A data link control system for plural stations, comprising:
   a transmission line coupled to said plural stations for transmitting data and signals; and
   a common request line for carrying a request signal which indicates the ability to be assigned to a master control function for supervising the data link, wherein said plural stations contains one node station and other node stations, at least one of which has the same configuration as said one node station, said one node station comprising:
   autoresponse means for receiving data from said transmission line in a reception mode and transmitting data of a predetermined format onto said transmission line in a transmission mode;
   control circuit means coupled to said common reuest line for generating said request signal so that said common request line is set to a busy status when said one node station requests to be assigned to the master control function;
   detecting circuit means coupled to said common request line for detecting the status of said common request line in accordance with the contents of said request signal; and
   microprocessor means coupled to said autoresponse means, control circuit means and detecting circuit means for restraining a search for finding out if any of said other node stations requests to be assigned to the master control function when said common request line is not in the busy status, and for assigning the master control function in accordance with a polling-/selecting system when one or more of said other node stations request the master control function, said microprocessor means of said one node station supervising the data link when said one node station obtains the master control function,
   wherein said autoresponse means is responsive to a question regarding the assigning of the master control function delivered from one of the stations which has the master control function, but the receiving/transmitting operation of said autoresponse means is free from the operation of said microprocessor means.

2. A system according to claim 1 further comprising:
   a special request line coupled to said one and other node stations for carrying a special request signal having a priority over the request signal on said common request line; and
   a supervisor station coupled to said transmission line, common request line and special request line, said supervisor station including:
   supervisor autoresponse means for receiving data from said transmission line in a reception mode and transmitting data of a predetermined format onto said transmission line in a transmission mode;
   supervisor control circuit means coupled to said special request line for generating said special request signal so that said special request line is set to a busy status when said supervisor station requests to be assigned to the master control function;
   supervisor detecting circuit means for detecting the status of said special request line in accordance with the contenets of said special request signal, and detecting the status of said common request line in accordance with the contents of said request signal; and
   supervisor microprocessor means coupled to said supervisor autoresponse means, supervisor control circuit means and supervisor detecting circuit means, for restraining a search for finding out if any of said one and other node stations requests to be assigned to the master control function when said common request line is not in the busy status, for obtaining the master control function when said special request line is set in the busy status, and for assigning the master control function in accordance with a polling/selecting system when one or more of said one and other node stations request the master control funtion, said supervisor microprocessor means governing the data link when none of said one and other node stations obtains the master control function,
   wherein said supervisor autoresponse means is responsive to a question regarding the assigning of the master control function delivered from one of the stations which has the master control function, but the receiving/transmitting operation of said supervisor autoresponse means is free from the operation of said supervisor microprocessor means.

3. A system according to claim 2, wherein each of said one and other node stations includes:
means coupled to said special request line and to said microprocessor means for detecting the status of said special request line in accordance with the contents of said special request signal, said microprocessor means assigning the master control function to said supervisor station when said special request line is set in the busy status.

4. A system according to claim 1, wherein said control circuit means includes:
a switch circuit for changing the potential of said common request line between high and low levels, one of said high and low levels representing said request signal which indicates said busy status.

5. A system according to claim 4, wherein said detecting circuit means includes:
an input port for sensing the potential of said common request line to detect the status thereof; and
sensor circuit for sensing a change in the potential of said common request line to detect a change in the status thereof.

6. A system according to claim 2, wherein said supervisor control circuit means includes:
a supervisor switch circuit for changing the potential of said special request line between high and low levels, one of said high and low levels representing said special request signal which indicates said busy status.

7. A system according to claim 6, wherein said supervisor detecting circuit means includes:
a supervisor input port for sensing the potential of said special request line to detect the status thereof; and
a supervisor sensor circuit for sensing a change in the potential of said special request line to detect a change in the status thereof.

8. A system according to claim 1, wherein said autoresponse means includes
a communications interface for converting data on said transmission line into data of a format suitable to said microprocessor means, and converting data from said microprocessor means into data of a format suitable to said transmission line; and
an autoresponse control circuit for effecting data exchanging with said transmission line via said communications interface.

9. A system according to claim 2, said supervisor autoresponse means including:
a supervisor communications interface for converting data on said transmission line into data of a format suitable to said supervisor microprocessor means and converting data from said supervisor microprocessor means into data of a format suitable to said transmission line; and
a supervisor autoresponse control circuit for effecting data exchanging with said transmission line via said supervisor communications interface.

10. A system according to claim 8, wherein said autoresponse means includes a memory for storing the data from said communications interface and delivering the stored data to said communications interface, and said autoresponse means further includes:
a DMA controller coupled to said autoresponse control circuit and to said memory for connecting said memory to said transmission line when the data exchanging operation of said autoresponse control circuit is effected, the storing/delivering operation of said memory being free from the operation of said microprocessor means when said DMA controller connects said memory to said transmission line.

11. A system according to claim 9, wherein said supervisor autoresponse means includes a supervisor memory for storing the data from said supervisor communications interface and delivering the stored data to said supervisor communications interface, and said supervisor autoresponse means further includes:
a supervisor DMA controller coupled to said supervisor autoresponse control circuit and to said supervisor memory for connecting said supervisor memory to said transnmission line when the data exchanging operation of said supervisor autoresponse control circuit is effected, the storing/delivering operation of said supervisor memory being free from the operation of said supervisor microprocessor means when said supervisor DMA controller connects said supervisor memory to said transmission line.

12. A system acording to claim 10, wherein said autoresponse control circuit includes:
a judging circuit for determining whether or not an autoresponse mode is established; and
a DMA control generator coupled to said judging circuit and to said DMA controller for effecting the connecting operation of said DMA controller when said autoresponse mode is established.

13. A system according to claim 11 wherein said supervisor autoresponse control circuit includes:
a supervisor judging circuit for determining whether or not a supervisor autoresponse mode is established; and
a supervisor DMA control generator coupled to said supervisor judging circuit and to said supervisor DMA controller for effecting the connecting operation of said supervisor DMA controller when said supervisor autoresponse mode is established.

14. A system according to claim 12, wherein said autoresponse control circuit further includes:
a receiving status check circuit coupled to said DMA control generator for detecting whether or not reception of data from a transmission line is completed without error, said DMA control generator being effected only when said receiving status check circuit detects that the reception is completed without error.

15. A system according to claim 13, wherein said supervisor autoresponse control circuit further inludes:
a supervisor receiving status check circuit coupled to said supervisor DMA control generator for detecting whether or not reception of data from a transmission line is completed without error, said supervisor DMA control generator being effected only when said supervisor receiving status check circuit detects that the reception is completed without error.

16. A system according to claim 12, wherein said autoresponse control circuit further includes:
an interrupt generator coupled to said judging circuit and to said microprocessor means, for interrupting the operation of said microprocessor means when said judging circuit determines that the autoresponse mode is not established.

17. A system according to claim 13, wherein said supervisor autoresponse control circuit further includes:
a supervisor interrupt generator coupled to said supervisor judging circuit and to said supervisor microprocessor means for interrupting the operation of said supervisor microprocessor means when said supervisor judging circuit determines that the supervisor autoresponse mode is not established.

18. A system according to claim 16, wherein said interrupt generator is coupled to said judging circuit and to said receiving status check circuit and said interrupt generator interrupts the operation of said microprocessor means only when said receiving status check circuit detects that the reception is completed without error and said judging circuit determines that the autoresponse mode is not established.

19. A system according to claim 17, wherein said supervisor interrupt generator is coupled to said supervisor judging circuit and to said supervisor receiving status check circuit, and said supervisor interrupt generator interrupts the operation of said supervisor microprocessor means only when said supervisor receiving status check circuit detects that the reception is completed without error and said supervisor judging circuit determines that the supervisor autoresponse mode is not established.

20. A system according to claim 1, wherein all of said other node stations have the same configuration as said one node station.

* * * * *